United States Patent

[11] 3,542,066

[72] Inventor  Jose Juan Cordova
              Chirimay 65, Buenos Aires, Argentina
[21] Appl. No. 735,076
[22] Filed     June 6, 1968
[45] Patented  Nov. 24, 1970

[54] SINGLE CONTROL VALVE DEVICE FOR REGULATING TEMPERATURE AND FLOW TO A SELECTED OUTLET FROM HOT AND COLD INLETS
11 Claims, 9 Drawing Figs.
[52] U.S. Cl. ................................................. 137/597,
                                      137/625.17; 251/287
[51] Int. Cl. ..................................................... F16k 19/00
[50] Field of Search ............................................ 137/625.17,
                                                                 597

[56] References Cited
UNITED STATES PATENTS
1,945,646  2/1934  Kumpman et al ............  137/597X
3,168,112  2/1965  Kungler .........................  137/625.17
3,202,181  8/1965  West ..............................  137/625.17

Primary Examiner—Robert G. Nilson
Attorney—Waters, Roditi, Schwartz & Nissen

ABSTRACT: A valve device has a single central control for controlling the flow and regulating the temperature of two fluids, for use as a unitary selector in bath and shower combinations or similar assemblies. The valve device has a main body with two fluid inlets and two fluid outlets and a shaped selector member is mounted within the body and is able to perform controlled sliding and rotational movements by which the desired outlet is selected and the flow as well as the mixing of fluids is established within the body from the inlets to the selected outlet.

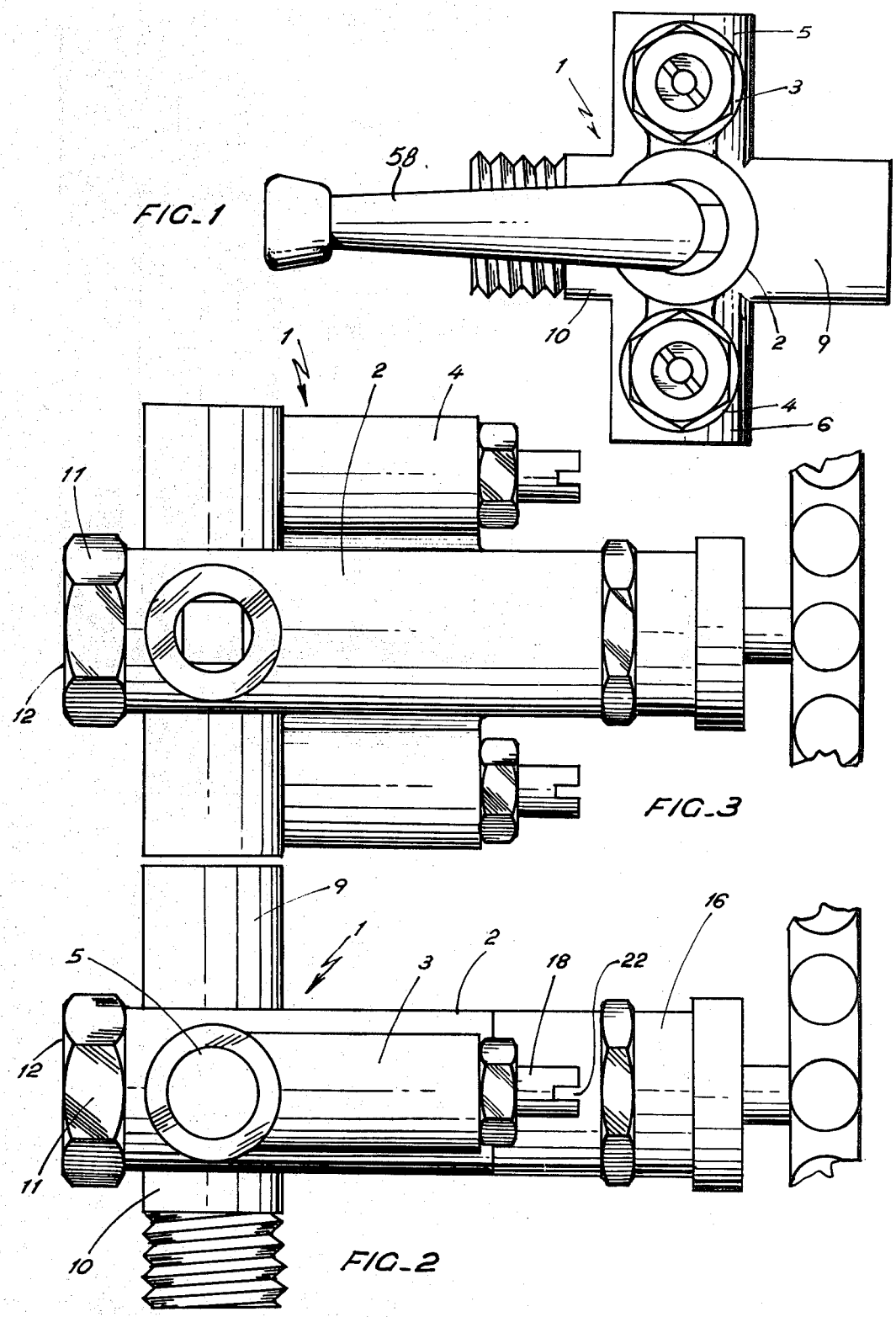

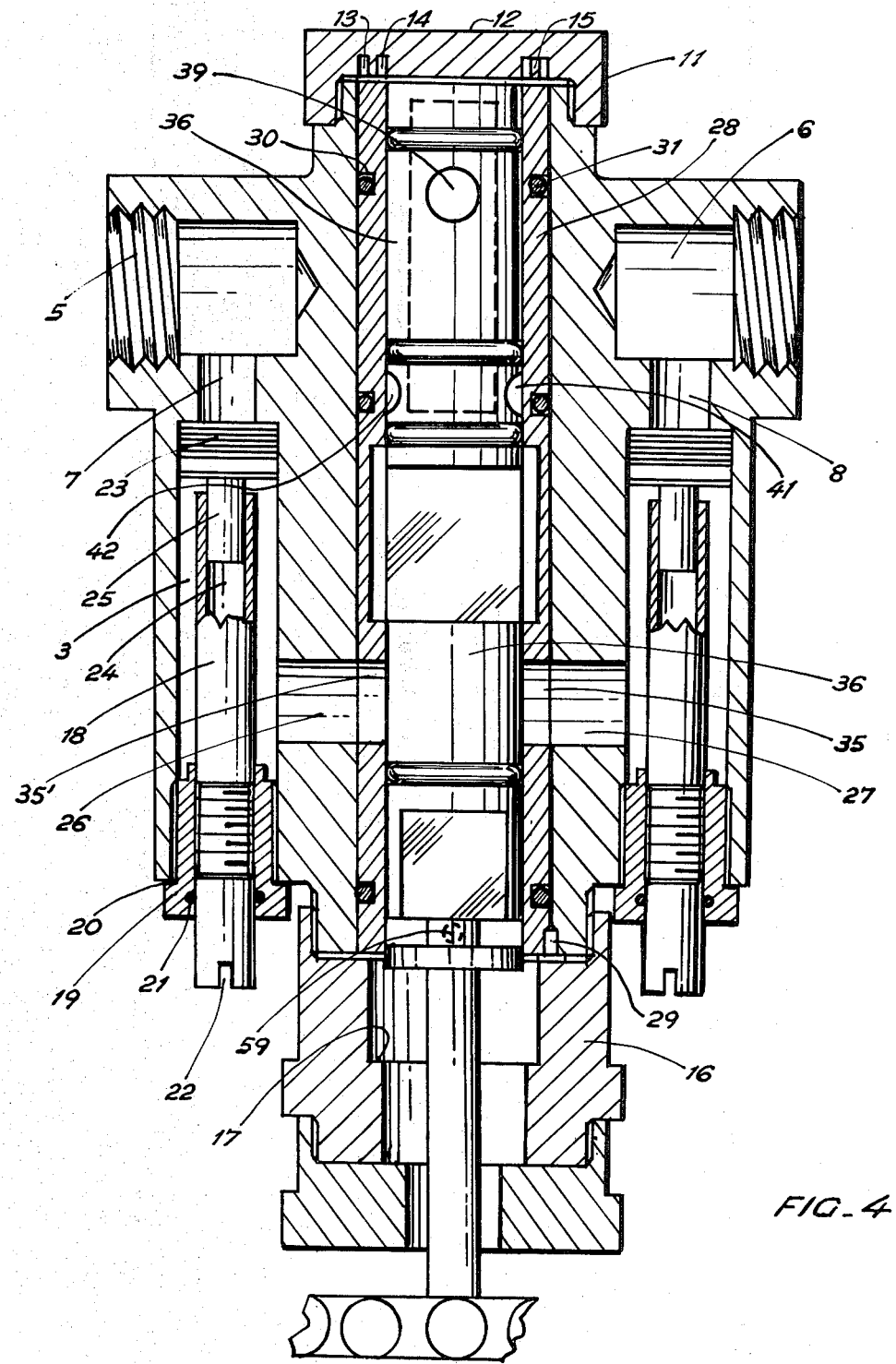
FIG_4

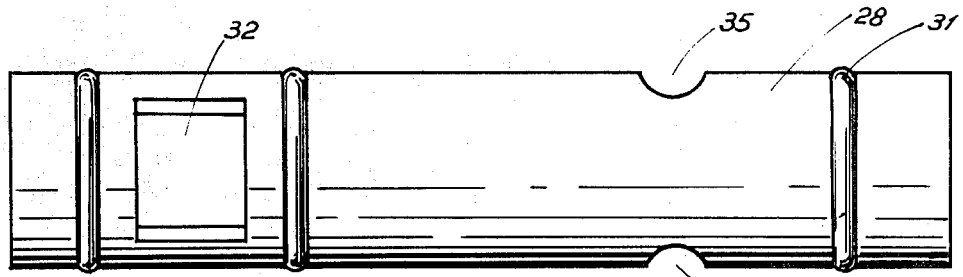
FIG_5
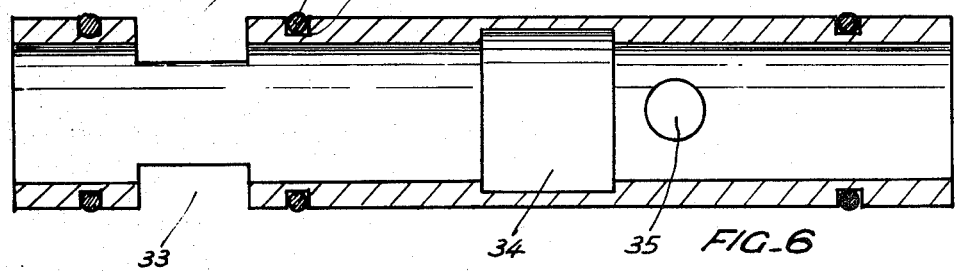
FIG_6
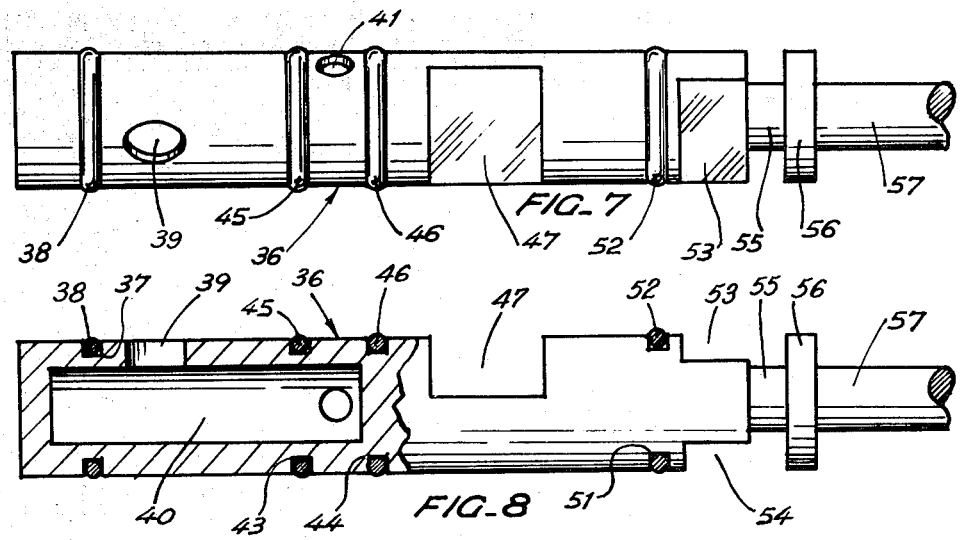
FIG_7
FIG_8
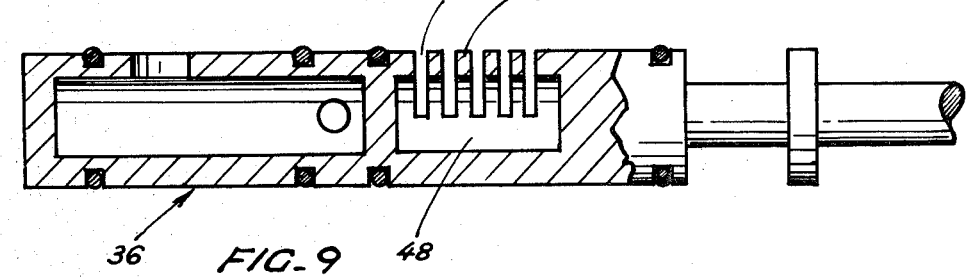
FIG_9

3,542,066

SINGLE CONTROL VALVE DEVICE FOR REGULATING TEMPERATURE AND FLOW TO A SELECTED OUTLET FROM HOT AND COLD INLETS

This invention relates to a valve device, and particularly to a valve device having a single central control capable of dosifying the flow and regulating the temperatures to two fluids, mainly for use as a unitary selector in bath and shower combinations.

The invention replaces the valve devices used at present as assemblies to provide hot and cold water in showers and immersion baths and which, notwithstanding the several different mechanical combinations offered, require a relatively complicated manipulation and are not protected against erroneous handling or absentmindedness that may cause disagreeable and even dangerous unexpected conditions.

The single central control of the present device can replace, with great technical and economical advantages, all the combinations now in use, for it allows an easy and permanent regulation of flow and blend from a maximum to a minumum of hot and cold water at the tap of the immersion both or at a shower that may be connected to the same pipe circuit.

It must be noted that the foregoing results are obtained by means of a single movable member which is lodged in a bush placed in a central chamber in the a valve body, which assembly can, moreover, be replaced when needed by any unskilled person.

As it will be seen hereafter, the body of this device has two lateral valve chambers that lodge valve elements also replaceable, said valves regulating the input of fluid and allowing the following functions: preestablishing the volume at each water inlet, be it hot or cold, in relation to the pressure in the pipe lines; hermetically closing one or both water lines; in the event that one of the pipes becomes empty they automatically block it and prevent intercommunication; to automatically balance any eventual difference in pressure between hot and cold water; to block out the passage of water when it becomes necessary to replace the central assembly and, finally, they may carry a coaxial filter.

The mention of all these multiple functions implies, of course, that all the additional cocks and taps that are used at present to cover them are no longer necessary.

The combinations of water provision lines, regulation, blend and distribution that may be adapted to the present device are numberless, as it will be readily noted from the following description.

The present device allows for several embodiments, from a simple output to a multiple valve type with several inlets and outlets. The manual control, consists of a handle that is rotatable as well as axially displaceable, while suitable indicators, guides or notches are correspondingly placed in the cover or body, to show the different functions:

The rechangeable central assembly has inlets and outlets conveniently placed for guiding the water within the valve body, and there are also provided grooves that carry sealing rings of a suitable material, such as neoprene, while similar rings may be placed at any port requiring an hermetic seal.

Externally, the body is provided with at least one hot and one cold water inlet placed at the same or different planes, and at least one outlet that may also be placed at the same or a different plane with regard to the inlets, the angle between the latter may also be up to 180°.

The contact surfaces of the movable member and the bush may also be sealed by sealing rings placed in grooves at one or both said surfaces. The central member communicates, by means of an inner peripheral chamber in the bush, with the water inlets and outlets, all the required combinations being obtained by axial and rotational movements of the handle placed at the external end of said rod, the amount of fluid flow being regulated by an outward movement of the handle, while the blend for the required temperature is obtained by rotation of the latter to one side or the other of a central point, while a 180° rotation of the handle, that can be effected only with the system closed, turns the water flow from the bath tap to the shower and vice versa.

The following description refers to a particular embodiment of the invention, that is given only as an illustrative example of its nature, and making reference to the accompanying drawings where:

FIG. 1 is a side elevation view of the device;
FIG. 2 is a frontal view in which the device has a different but equivalent type of handle, for better illustrative purposes;
FIG. 3 is a plan view of the device;
FIG. 4 is a sectional plan view of the device;
FIG. 5 is a side view of the bush;
FIG. 6 is a longitudinal section through the bush of FIG. 5;
FIG. 7 is a side view of the movable member;
FIG. 8 is another view of the movable member, rotated 90° from the FIG. 7 position, and shown partially in section; and
FIG. 9 is a longitudinal section of another version of the movable member.

In all these FIGS. the same reference numbers indicate the same or equivalent parts.

As may be seen in FIGS. 1, 2 and 3, the device includes a body 1 having a central cylindrical hollow portion 2 open at both ends flanked by two other hollow cylinders 3 and 4, integral with it and of smaller external diameter. Near one end of said central portion, there are two diametrically opposite cylindrical chambers 5 and 6 open at one end and communicating with cylinders 3 and 4 through ports 7 and 8 (FIG. 4), while at right angles to said chambers two diametrically opposite cylindrical hollow projections 9 and 10 extend from the central portion, with which they communicate.

The end of the central portion 1, adjacent to the above projections is closed by a sealing nut 11 having at the inner surface of its frontal face 12 two concentric grooves 13 and 14 connected by a slot 15, while a small internal passage (not shown) in the central portion, communicates said grooves with projection 9 or 10.

At the other end of the central portion a hollow retaining member 16 open at both ends, is threaded, the internal walls having a step 17, the purpose of which will be described hereafter.

Within cylinders 3 and 4 a valve assembly is placed, being formed by a coaxial rod 18 threaded into a sealing member 19 placed at the frontal opening of the cylinders and seated on a gasket 20, said rod 18 having an end that projects externally from the member, through a sealing ring 21, and provided with a diametral groove 22. At the other end, a valve member 23 is telescopically placed in a coaxial recess 24 of the rod by means of a slidable stud 25. The chambers thus formed in cylinders 3 and 4 communicate with the central portion 1 through corresponding ports 26 and 27.

Within said central portion 1, a removable bush 28 (FIGS. 5 and 6) extending over the whole length of portion 1, is lodged and held in position by means of a pin 29 retained by member 16. Bush 28 is provided with at least three peripheral grooves 30, two of which are placed near the ends and another at approximately its middle portion, each groove carrying a sealing ring 31. Near the end of the bush contacting the sealing nut 11, and between two of said grooves 30, two diametrically opposite wide openings 32 and 33 are provided in correspondence with the openings of projections 9 and 10, while the inner walls of the bush 28, following said central groove, have a recessed portion 34 that forms an inner peripheral chamber which is, in turn, followed by two diametrically opposite parts 35 and 35' placed at right angles with regard to openings 32 and 33.

The bush 28 carries a movable conformed member 36, FIGS. 7, 8 and 9, that constitutes the basic element of the device, as it will be seen further on.

This conformed member of general cylindrical shape has, near the end adjacent to the sealing nut 11, a peripheral groove 37 that carries a sealing ring 38, while a port 39 is placed close to this groove and communicates with an inner chamber 40 that extends along a portion of the member 36, and has two diametrically opposite ports 41 and 42 placed at right angles to port 39 and flanked by two grooves 43 and 44 carrying sealing rings 45 and 46.

Adjacent to sealing ring 46, the member body has an external recess 47 that occupies at least the whole width of the body and has a flat bottom of substantially square shape, that is parallel to the axis of ports 41 and 42. In the embodiment shown in FIG. 9, recess 47 is replaced by a chamber 48 having a plurality of transverse grooves 49 that form a semicylindrical grated zone 50 in body 36.

At a distance from groove 47, or of grated zone 50, there is another groove 51 carrying a sealing ring 52 and, adjacent to it, two opposite plane recesses 53 and 54, having the same angular orientation as recess 47; that is to say, their bottom planes are parallel to the axis of ports 41 and 42.

Said recesses 53 and 54 are followed by a throat 55 and a step 46 which is continued by a stem 57 that passes through retaining member 16 and projects from it, an actuating handle 58 being placed at its protruding end. As seen in FIG. 1 this handle may be shaped as a lever, in which case it is articulated on the end of stem 57, or it may have any other suitable shape and be securely mounted on said stem by suitable means.

Finally, a removable stud 59, indicated by a dotted circumference in FIG. 4, slightly protrudes from the inner wall of bush 28, this stud being placed in correspondence with throat 55 and in the same generatrix as the one in which the center of port 39 lies.

The foregoing is, of course, a structural description of the basic components and their relative disposition in the device. It is obvious that the shape or dimensional relationship of at least some of them may change without altering the basic functional characteristics of the assembly, as hereafter described.

The connection to the main piping system is made through chambers 5 and 6, by any suitable means, coupling to each of them the cold and hot water supply lines, respectively, while the pipe leading to the tap is coupled to projection 10 and the one leading to the shower is connected to projection 9, although this order may be reversed without altering the functional characteristics of the device.

When the conformed member 36 is completely pushed back within bush 28, as shown in FIG. 4, and valves 23 are seated over ports 7 and 8, the device is dry, no water being admitted beyond chambers 5 and 6. In order to place the assembly in operation, rods 18 are turned by engagement in grooves 22 so as to make them emerge further from members 19, thus opening valve members 23 which are then pushed back from ports 7 and 8 by the pressure of the water contained in chambers 5 and 6, telescoping stud 25 into recess 24, on rod 18. The flow of water entering the chambers of cylinders 3 and 4 can be regulated simply by rotating the rods 18 so that the normal operating position of valve elements 23 is closer or farther away from ports 7 and 8, depending on the pressure of water in the pipes and the amount that should enter the device and, consequently, be dispensed therefrom.

When the conformed member 36 is at the position shown in FIG. 4, ports 35 and 35' in bush 28 and, in consequence, ports 26 and 27 in correspondence with them, are closed by the body of member 36. The direction in which the water is desired to flow, that is to say, if the tap or shower is to be served, is selected by suitable indicia placed at the front cover (not shown) of the device and a corresponding indicator in handle 58. When this handle is turned to place the indicator in coincidence with said indicia, port 39 in member 36 faces the general direction of projections 9 or 10, having its axis in the same plane, but not coincident, with their axis, this port being blinded by the inner wall of bush 28 when member 36 occupies the position shown in FIG. 4.

The flow of water through the device is started by pulling handle 58, with which member 36 is moved axially, giving rise to several operations simultaneously, these being that stud 59 passes from the throat 55 over recess 53, or 54 depending on the position of handle 58, until it abuts against the body of member 36; the walls of member 36 slide from ports 35 and 35' allowing the chambers of cylinders 3 and 4 to communicate with recess 34 and, in consequence, with the inner peripheral chamber 34 in bush 28; in turn, ports 41 and 42 slide over to said chamber 34 and, therefore, the latter becomes communicated with chamber 40 in member 36 while, at the same time port 39 becomes aligned with the selected opening 32 of bush 28 and, in consequence, with the corresponding projection 9 or 10, as the case may be.

The hot and cold water currents that flow through ports 26, 27, 35 and 35' become properly mixed within the valve body before reaching the outlet towards which it is directed.

The blend of hot and cold water for attaining a desired temperature is obtained by rotating the handle 58 slightly to the right or left, as the case may be, which movement permits the underpart of recess 47, or its equivalent in FIG. 9, to partially screen the ports communicating with the chambers of cylinders 3 or 4 which are opposite to the sense of rotation, diminishing the flow of water through them while increasing, in a same amount, the flow that passes through the opposite ports into recess 47. It may be inferred from the foregoing that the angular movement of handle 58 need be very slight for reaching the desired temperature at the output of the device.

If only one inlet is to be used, be it hot or cold, handle 58 is rotated until the plane bottom of recess 53, or 54, that faces stud 59, abuts against it, in which position the underbody of recess 47 closes the above referred ports and the recess faces the opposite ones, which become completely open.

It is also evident from the above description, that to decrease the flow at the outlet it is only necessary to push handle 58 slightly, and partially screen ports 35 and 35' with a portion of the body of member 36, while the rest of the inner passages become obstructed in a similar manner. If the pressure on handle 58 is maintained, member 36 is returned to its original position and the flow of water at the outlet ceases.

As it may be inferred from the above structural description, as well as from the drawings, any leak is prevented by the sealing rings carried by the bush 28 and member 36 while, on the other hand, these rings may easily be replaced, when necessary, simply by withdrawing retaining member 16 and sliding forward bush 28, thus allowing removable stud 59 to emerge from the central portion 1. When this stud is withdrawn member 36 may be slid out from bush 28. Before carrying out this operation, it is of course necessary to close the valve devices in cylinders 3 and 4, while any vacuum at the bottom of the device that may be produced by the sliding movement of member 36, is prevented by the communication provided through grooves 13 and 14 at the sealing nut 11, and the internal passage that connects them with projections 9 or 10.

I claim:

1. A valve device having a single central control for dosifying the flow and regulating the temperature of two fluids, mainly for use as a unitary selector in bath and shower combinations, or similar assemblies, and comprising a main body having two fluid inlets and two fluid outlets, and a generally cylindrical selector member which is able to perform controlled sliding and rotational movements within the body when actuated, said member being provided, near its rear end, with an internal chamber having two diametrically opposite inlet ports at an end, and one outlet port placed at right angles to said inlet ports and near the other end of the chamber adjacent to the end of said member, the outlet port being turned towards the general direction of the selected outlet by a rotational movement of the member, and placed in correspondence with said outlet by an outward sliding movement of said member, while an internal recess in the valve body and a corresponding external recess in the member allow the fluid flow to circulate from the inlets to the selected outlet, through said internal chamber of said member.

2. A valve device as claimed in claim 1, in which the internal recess surrounds said cylindrical selector member at approximately its middle portion, and the shape of the external recess in said member is that of at least a semicylinder, both recesses being in correspondence when the device is at its closed position.

3. A valve device as claimed in claim 2, in which the external recess of said member is covered by a grid.

4. A valve device having a single central control for dosifying the flow and regulating the temperature of two fluids, mainly for use as a unitary selector in bath and shower combinations, or similar assemblies, and comprising a main body having two fluid inlets and two fluid outlets, and a generally cylindrical selector member which is able to perform controlled sliding and rotational movements within the body when actuated, said member being shaped so that the sliding movement opens and shuts the device while its rotation selects, in a first position, the desired outlet and in a second position opens one or the other or both fluid inlets, a throat being provided at the forward end of said member, which is followed rearwardly by two opposite flat surfaces; a removable stud projecting from the inner wall of the body in correspondence with said throat, allowing said member to be fully rotated when at its closed position, while one or other of said flat surfaces abut against said stud when the device is at its open position, the outward sliding movement of said member being limited also by said stud in combination with the step formed in the member body by said flat surfaces.

5. A valve device having a single central control for dosifying the flow and regulating the temperature of two fluids, mainly for use as a unitary selector in bath and shower combinations or similar assemblies, and comprising a main body having two fluid inlets and two fluid outlets, and a selector member placed within said body, said member being able to perform controlled sliding and rotational movements in the body when actuated, by which the desired outlet is selected and the flow as well as the blend of fluids is established within the body from said inlets to the selected outlet; said member being of general cylindrical shape and provided near its rear end with an internal chamber having two diametrically opposite inlet ports at an end, and one outlet port placed at right angles to said inlet ports, near the other end of said chamber adjacent to the end of the member, the outlet port being turned towards the general direction of the selected outlet in the device by a rotational movement of the member, and placed in correspondence with said outlet by an outward sliding movement of the member; an internal cylindrically-shaped recess in said body surrounds the selector member at approximately its middle portion and is placed in correspondence with a recess shaped at least as a semicylinder carried by said member, when the device is in its closed position, said recesses and ports allowing the fluid to circulate within the device from inlets to selected outlet when the selector member is in an advanced position.

6. A valve device having a single central control for dosifying the flow and regulating the temperature of two fluids, mainly for use as a unitary selector in both and shower combinations or similar assemblies, and comprising a main body having two fluid inlets and two fluid outlets; a valve assembly being placed at each inlet and provided with means for regulating the fluid flow that passes through them; a generally cylindrical selector member provided near its rear end, with an internal chamber having two diametrically opposite inlet ports at an end and one outlet port placed at right angles to said inlet ports and near the other end of the chamber adjacent to the end of said member, the outlet port being turned towards the general direction of the selected outlet by a rotational movement of the member and placed in correspondence with said outlet by an outward sliding movement of said member, while an internal recess in the valve body and a core corresponding external recess in the member allow the fluid flow to circulate from the inlets to the selected outlet, through said internal chamber of said member.

7. A valve device, as claimed in claim 6, in which the internal recess surrounds said cylindrical selector member at approximately its middle portion, and the shape of the external recess in said member is that of at least a semicylinder, both recesses being in correspondence when the device is at its closed position.

8. A valve device, as claimed in claim 6, in which the external recess of said member is covered by a grid.

9. A valve device having a single central control for dosifying the flow and regulating the temperature of two fluids, mainly for use as a unitary selector in bath and shower combinations or similar assemblies, and comprising a main body having two fluid inlets and two fluid outlets; a removable bush placed within said body and having an internal peripheric recess approximately at its middle portion; a generally cylindrical selector member provided near its rear end, with an internal chamber having two diametrically opposite inlet ports at an end and one outlet port placed at right angles to said inlet ports and near the other end of the chamber adjacent to the end of said member, the outlet port being turned towards the general direction of the selected outlet by a rotational movement of the member, and placed in correspondence with said outlet by an outward sliding movement of said member, an external recess in said member placed correspondingly to said peripheric recess in the bush, both recesses allowing the fluid to flow from the inlets to the selected outlet, through said internal chamber of said member, when the device is operating.

10. A valve device, as claimed in claim 9, in which the internal recess surrounds said cylindrical selector member at approximately its middle portion, and the shape of the external recess in said member is that of at least a semicylinder, both recesses being in correspondence when the device is at its closed position.

11. A valve device, as claimed in claim 9, in which the external recess of said member is covered by a grid.